Feb. 18, 1958 E. W. HOLMAN 2,824,174

SELECTIVE RINGING CIRCUIT USING A TRANSISTOR

Filed Nov. 18, 1954

INVENTOR
E. W. HOLMAN
BY [signature]
ATTORNEY

United States Patent Office 2,824,174

Patented Feb. 18, 1958

2,824,174

SELECTIVE RINGING CIRCUIT USING A TRANSISTOR

Erwin W. Holman, Summit, N. J., assignor to Bell Telephone Laboratories, Incorporated, New York, N. Y., a corporation of New York Application November 18, 1954, Serial No. 469,605

15 Claims. (Cl. 179—86)

This invention relates to signaling systems and more particularly to multiparty telephone selective signaling systems.

One of the major problems in the telephone plant is that of providing individual party ringing or signaling on multiparty lines. Systems are known in which a station on the line may be selectively signaled without interference with the remaining stations through the use of distinct combinations of a limited number of variables such as choice of line conductor and choice of voltage polarity.

Further systems are known in which greater selectivity is obtained through the use of frequency selective filters. One such system is disclosed in an application of E. W. Holman and W. C. Schmidt, Serial No. 469,645, filed November 18, 1954. The circuits disclosed therein are responsive to single frequency signals in the voice band and comprise a filter circuit, a low current device such as a transistor controlled thereby, and a ringer which is in turn controlled by the current conduction in the transistor. The use of a transistor in circuits such as these is highly advantageous due to its compact size, lack of warm up time, and low current drain. In a system of the specific type disclosed in the above-described application, however, it is necessary to provide a separate source of transistor power at each subscriber station. This requirement may be disadvantageous as it may add considerable expense and complexity to the signaling system. In addition, local power may not be available in an emergency and consequently is undesirable in the telephone plant.

One of the principal objects of the present invention is to provide an improved low current full selective signaling system. More specifically, it is an object of this invention to provide a low current full selective ringing circuit which does not require a separate source of power at the subscriber station.

A further object of this invention is to provide a full selective ringing circuit for multiparty telephone lines in which a transistor amplifier at the subset is operated from central office power.

A still further object of this invention is to provide a voice frequency selective signaling system in which the signals transmitted to the subsets are pulsed at a relatively low rate so as to provide both frequency selection and ringer operation.

It is a still further object of this invention to provide a transistor operated full selective ringing circuit which eliminates the need for stand-by power.

In one specific illustrative embodiment of this invention, the ringing circuit comprises a relatively simple inductance capacitance filter tuned to the signaling frequency assigned to the particular subscriber station. Signals of this frequency are passed by this selective filter to a transistor circuit where they are amplified. The transistor output is rectified and applied to the winding of a relay which in turn controls the circuit which applies power to the ringer. The circuit utilizes a transistor supply D. C. voltage from the central office having superimposed thereon the signal which is pulsed at a 20 cycle rate to pulse the relay and in turn operate the ringer.

In another specific illustrative embodiment of the invention, the circuit is similar to the one described above with the exception that the need for stand-by D. C. power for the transistor has been eliminated. In this embodiment the transistor is grounded and the D. C. power therefor is supplied from one line to ground by means of a switch located at the central office which is operated only during the ringing cycle. This arrangement permits both the signaling and the ringing voltages to be transmitted to the subset over the line.

In still another specific embodiment of the invention the circuit is generally similar to the ones described above with the exception that a 20 cycle rectifier network is connected between line and the transistor. Both the 20 cycle ringing voltage and voice frequency signaling voltage are transmitted over the line to the subset, the ringing voltage being rectified by the rectifier network and furnished to the transistor to provide D. C. operating power.

In accordance with one feature of this invention a transistor controlled selective ringing circuit is operated by central office power thereby eliminating the need for a separate source of power at the subset.

In accordance with a further feature of this invention a transistor amplifier is made responsive to a predetermined signaling frequency through a selective filter thereby to control the operation of a ringer, the operating power for the transistor, the signaling frequency, and the ringing voltage all being made available to the subset from the central office over the subscriber line.

More specifically, it is a feature of one embodiment of this invention that the D. C. voltage supply for the transistor have superimposed thereon the selective signal which is pulsed at a 20 cycle rate to pulse the ringing relay and in turn operate the ringer.

It is a feature of another embodiment of this invention that one electrode of the transistor be grounded and that the D. C. voltage be supplied to the transistor from one line to ground by means of a switching arrangement in the central office which is operated only during the ringing cycle.

It is a feature of still another embodiment of this invention that rectifying means be connected between the line and the transistor whereby the 20 cycle ringing voltage is rectified to supply D. C. power for the transistor.

A complete understanding of this invention and of the various features thereof may be gained from consideration of the following detailed description and the accompanying drawing, in which.

Figure 1:
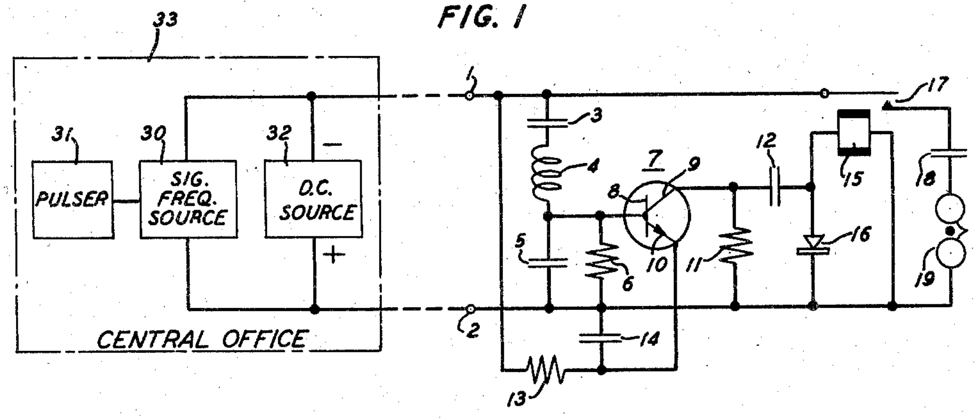
Fig. 1 is a schematic representation of a selective ringing circuit for use in a multistation system illustrative of one specific embodiment of the invention.

In order that the invention be disclosed in a clear and concise manner, the disclosure has been simplified to some extent by omitting the talking portions of the preferred embodiments illustrated in the drawing and disclosing only the signaling portions of the circuit at the subscriber's station. Although the invention is applicable to remote multistation signaling systems generally and is not limited to telephone use alone, it is understood that those skilled in the telephone art may readily add speech transmitting and receiving apparatus to the signaling circuits illustrated in the drawing, in a manner well known in the art, and that any one of many well-known types of telephone station sets may be employed for this purpose.

Referring now to the drawing, the specific embodiment of the invention illustrated in Fig. 1 is a selective ringing circuit adaptable for use at a subscriber station of a multiparty telephone system comprising a pair of terminals 1 and 2 connected to a source of multifrequency signals 30, controlled by a pulser 31 and a source of D. C. voltage 32 in a central office 33. A bandpass filter tuned to the frequency assigned the subscriber station is connected across the terminals 1 and 2, the filter advantageously comprising a capacitance 3, an inductance 4 and a capacitance 5, all connected in series. A resistance 6 is connected between the terminal 2 and the junction of inductance 4 and capacitance 5, a transistor 7 having a base electrode 8, a collector electrode 9 and an emitter electrode 10. The base electrode 8 is connected to the resistance 6, the collector electrode 9 being connected to a capacitance 12 and the emitter electrode 10 being connected to the terminal 1 by a resistance 13. A capacitance 14 is connected between the emitter electrode 10 and the terminal 2. A resistance 11 is connected between terminal 2 and the collector electrode side of capacitance 12. The other side of capacitance 12 is connected to the winding of a relay 15 and to a diode 16, both of which are connected to terminal 2. The normally-open contacts 17 of the relay 15 are connected on one side to terminal 1 and on the other side to a capacitance 18. A ringer 19 is connected between capacitance 18 and terminal 2.

In the operation of this specific embodiment of the invention the transistor 7 normally receives its power from the central office battery, such as D. C. source 32, over the subscriber line. The battery voltage, which advantageously may be 48 volts D. C., is applied to the line so that the transistor emitter electrode 10 is normally biased negatively with respect to the base electrode 8. In the stand-by condition the transistor 7 will have a steady current drain which may be of approximately 2 milliamperes and the relay in the transistor output will remain unoperated. When signals of the frequency to which the filter is tuned are received at the terminals 1 and 2 from the signal source 30, they are passed by the filter to the transistor and appear in an amplified form across the output resistance 11. The amplified signals are coupled to the relay circuit through the capacitance 12 where they are converted to pulsating D. C. by the rectifier 16, thereby energizing the relay 15 and closing the normally-open relay contacts 17. In this embodiment of the invention the signals advantageously are pulsed at a 20 cycle rate under the control of the pulser 31 to pulse the relay 15 and in turn operate the ringer 19. For signals remote from the frequency of the selective filter, i. e., for ringing signals for other stations on the party line, the insertion loss of the filter is sufficient to prevent operation of the relay. The filter should have a rather narrow band but not so narrow as to put undue requirements on the stability of the central office oscillator nor of the filter elements. Advantageously, the filter should be designed to allow a 200 cycle spacing between signal frequencies in the voice band.

Figure 2:
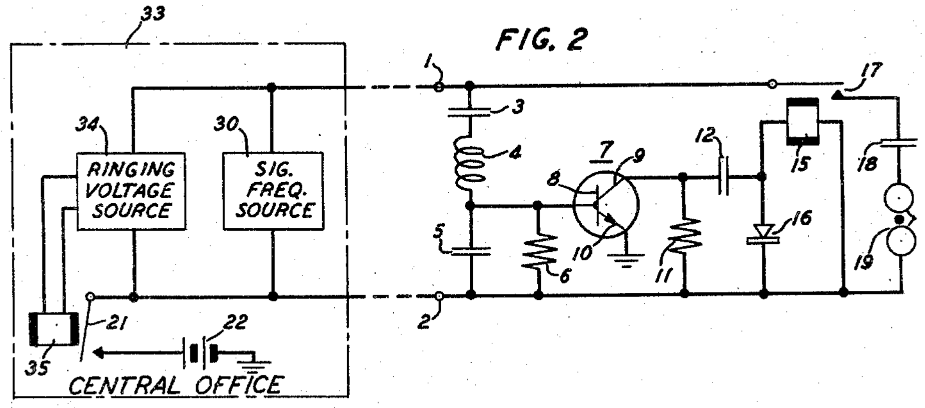
Fig. 2 is a schematic representation of a selective ringing circuit illustrative of another specific embodiment of the invention.

In multiparty systems having a relatively larger number of subscribers on the party line, the total current drain due to the stand-by power required by ringing circuits of the type shown in Fig. 1 could amount to undesirable proportions, as for example, an amount sufficient to operate the supervisory equipment in the central office. The circuit shown in Fig. 2 avoids the need for stand-by power. This circuit is similar in some respects to the circuit of Fig. 1 and comprises a pair of input terminals 1 and 2, a selective filter tuned to the signaling frequency connected between the input terminals and comprising a capacitance 3, an inductance 4 and a capacitance 5, connected in series, a transistor 7 comprising a base electrode 8, collector 9, and an emitter electrode 10, the base electrode being connected to the filter at the junction of inductance 4 and capacitance 5, and a resistance 6 connected between the base electrode 8 and terminal 2.

The emitter electrode 10 in this embodiment is connected directly to ground. The collector electrode 9 is connected through a resistance 11 to the terminal 2 and through a capacitance 12 to the winding of a relay 15 and a rectifier 16, each of the latter being returned to the terminal 2. Terminal 1 is also connected to a ringer 19, as in the prior embodiment, the latter being connected on the other side to the terminal 2.

The 20 cycle ringing voltage and the selective frequency signals are applied from the signal source 30 and the ringing source 34 in the central office 33 to the ringing circuit across the terminals 1 and 2. Direct current voltage from a central office source, such as battery 22, is not applied to the subscriber loop to power the transistor 7 during the off-ringing time. The battery 22 has its negative terminal grounded and its positive terminal connected to one contact of the normally-open switching means 21. The other contact is connected to the line conducor which connects to terminal 2 at the subscriber station. Switching means 21, which advantageously may be controlled by a relay such as relay 35 or the like, is energized at the central office only during the ringing cycle from the ringing voltage source 34 by any means known in the art. This results in a closing of the contacts 21 and the providing of D. C. power to the transistor 7. The circuit then operates in a manner as described above whereby signals of the signaling frequency are amplified and rectified to operate the relay 15 and close contacts 17 to apply the 20 cycle ringing voltage to the ringer 19.

Figure 3:
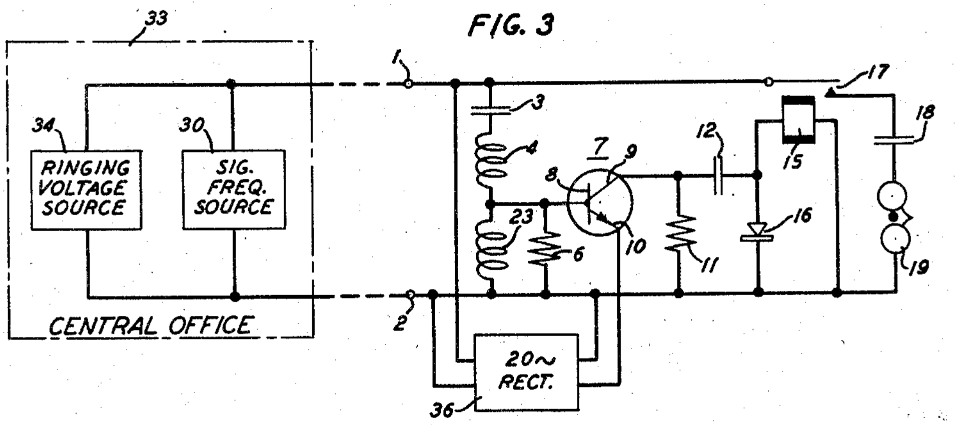
Fig. 3 is a schematic representation of a selective ringing circuit illustrative of a third specific embodiment of the invention.

Another embodiment of this invention which also avoids the need for transistor stand-by power is shown in Fig. 3 of the drawing. This circuit is similar to the circuits of Figs. 1 and 2 in several respects and similar reference numerals are employed to identify common elements. The selective signal and 20 cycle ringing voltage are applied to terminals 1 and 2 from sources 30 and 34, respectively, in the central office 33 over the line conductors. A bandpass filter comprising a capacitance 3, an inductance 4, and an inductance 23, all connected in series, are connected between terminals 1 and 2. The filter, which is tuned to the signaling frequency, is a modification of the filters disclosed in Figs. 1 and 2, and represents another type of filter which advantageously may be employed in the ringing circuit. This type of filter is particularly useful when a D. C. path at the output of the filter is desired. A transistor 7 comprising a base electrode 8, a collector electrode 9 and an emitter electrode 10, has its base electrode connected to the junction of the inductances 4 and 23. A resistance 6 is connected between the base electrode 8 and terminal 2. The collector electrode 9 is connected to terminal 2 through a resistance 11 and is coupled through a capacitance 12 to a rectifier 16 and to the winding of a relay 15. Terminal 1 is connected through the normally-open contacts 17 of relay 15 to a condenser 18 in series with a ringer 19. The relay 15, the rectifier 16 and the ringer 19 are each returned to terminal 2.

A tuned rectifying network 36, responsive only to the 20 cycle ringing signal, which advantageously may comprise any of the circuits well known in the art such as a 20 cycle filter network together with a silicon or germanium diode and a resistance capacitance filter, has its input connected across terminals 1 and 2 and its output connected to terminal 2 and the transistor emitter electrode 10, respectively. This network operates to rectify the 20 cycle ringing voltage when it is applied to the line from the central office 33 and filters the rectified voltage to supply the transistor with a D. C. operating potential. The rest of the operation of this embodiment is similar to that of the above-described embodiments.

Although ringing circuits employing relay controlled ringers have been shown in the specific embodiments discussed above, it will be understood by those skilled in the art that the disclosed circuits may obviously be adapted to direct operation with horn type ringers or the like.

It will further be understood that the specific embodiments of the invention which have been shown and described are merely illustrative of the principles of the invention and that further modification may be made therein without departing from the spirit and scope of the invention.

What is claimed is:

1. In a multiparty telephone system in which operating, signaling, and ringing power at suitable potentials is supplied from a central office, a selective ringing circuit comprising a pair of conductors connecting the ringing circuit to the central office, filter means tuned to a predetermined signaling frequency connected across said pair of conductors, ringer means comprising a ringer control relay having a pair of normally open contacts, transistor means comprising a base electrode, a collector electrode and an emitter electrode, said base electrode being connected to said filter means, and said collector electrode being connected to said ringer means, means for applying positive potential to said base electrode from said central office, means for applying negative potential to said emitter electrode from said central office, rectifying means connected across said ringer control relay, and a capacitance and a ringer connected in series with said pair of normally-open contacts of said relay across said pair of conductors, whereby signals of said predetermined frequency transmitted from the central office are amplified by said transistor means and rectified by said rectifier means to operate said relay, thereby closing said normally open contacts and applying ring power to said ringer.

2. In a multiparty telephone system, a transistor selective ringing circuit comprising a pair of conductors connecting the ringing circuit to a remote source of operating, signaling, and ringing power at suitable potentials, filter means tuned to a predetermined frequency connected across said pair of conductors, transistor means powered by the potentials and power received over said pair of conductors connected to said filter means for amplifying signals of said predetermined frequency received thereby, ringing means, and switching means connected to said transistor means and energized by the amplified signals for connecting said ringing means to said conductors whereby said ringing means is operated by the ringing power transmitted over said pair of conductors.

3. A signaling system for providing selective operation in response to signals of a predetermined frequency comprising a pair of line terminals for receiving remotely transmitted operating and signaling power at suitable potentials, a bandpass filter network tuned to said predetermined frequency connected across said line terminals, transistor means connected to said filter network for amplifying the signal frequency output therefrom, said transistor means obtaining operating power from said remotely transmitted potentials and power, a ringer in circuit with said line terminals and switching means responsive to the amplified signals for controlling the operation of said ringer.

4. In a telephone circuit, a central office, a pair of line conductors, a filter circuit connected across said conductors and responsive to a predetermined frequency, transistor amplifier means connected to said filter circuit, ringer means, means responsive to operation of said transistor means for connecting said ringer means to said line conductors, and means at said central office for simultaneously applying to said line conductor signals for providing operating power for said transistor amplifier means, for operating said ringer means, and for operating said transistor amplifier means through said filter circuit.

5. In a telephone circuit in accordance with claim 4, said means at said central office including means for applying a ringing signal to said conductors, means for applying a signal of said predetermined frequency to said conductors, and means for applying direct current power to said conductors.

6. In a telephone circuit in accordance with claim 5, said means for applying direct current power to said conductors applying said power continuously.

7. A selective ringing circuit for use in a multiparty telephone system comprising a source of pulsed signals and D. C. operating power at suitable potentials, a pair of line terminals connected to said source, a bandpass filter tuned to a predetermined signal frequency connected across said pair of line terminals, a transistor connected to said filter for amplifying the pulsed signal frequency output therefrom, said transistor comprising a base electrode connected through a resistance to the more positive of said line terminals, an emitter electrode connected through a resistance to the more negative of said line terminals, and a collector electrode coupled through a capacitance to a ringer means, said ringer means comprising a ringer control relay in circuit with a diode, whereby the amplified pulsed signals are rectified and energize said relay repetitively at the pulsed rate, a ringer, and a pair of normally-open contacts controlled by said relay connected between said ringer and one of said terminals for applying said pulsed signals to said ringer whenever said relay is energized.

8. In a multiparty telephone system, a selective signaling circuit responsive to signals of a predetermined frequency comprising a source of D. C. power at suitable potential and pulsed signals of a plurality of frequencies in the voice band including said predetermined frequency, a pair of line conductors connected between said source and said signaling circuit, filter means tuned to said predetermined frequency connected across said pair of conductors, transistor means connected to said filter means for amplifying the predetermined signal frequency output therefrom, means connecting elements of said transistor means to said line conductors whereby said transistor means is powered by said D. C. power, a ringer, and switching means responsive to the amplified signals for controlling the operation of said ringer by applying the pulsed signals thereto.

9. A signaling system for providing selective operation of a ringing circuit in response to signals of a predetermined frequency comprising a remote source of power at suitable potentials including signals of said predetermined frequency, ringing voltage, and D. C. potential, a pair of line conductors connecting said source to the ringing circuit, switching means at said source comprising a first normally-open pair of contacts, one contact being connected to one of said pair of conductors and the other contact being connected to one terminal of a D. C. potential means, the other terminal of which is connected to ground, said normally-open pair of contacts being closed only when said signals of said predetermined frequency and said ringing voltage are applied to the line conductors, a bandpass filter tuned to said predetermined frequency connected between said line conductors, and transistor means connected to said filter for amplifying signals of said predetermined frequency passed by said filter, said transistor means comprising a base electrode connected through a resistance to said one of said pair of conductors, an emitter electrode connected to ground, and a collector electrode coupled through a capacitance to ringer means comprising a control relay, a ringer, and a second normally-open pair of contacts in circuit with said ringer and said source of ringing voltage whereby energization of said control relay by the amplified signals closes said second normally-open pair of contacts and applies ringing power to said ringer.

10. A signaling system in accordance with claim 9 wherein said remote source of power includes a battery, the more negative terminal of which is connected to ground and the more positive terminal of which is connected to a contact of said first normally-open pair of contacts.

11. In a multiparty telephone system, a selective ringing circuit responsive to a predetermined signal frequency comprising a remote source of ringing power at a suitable voltage and signal frequencies including said predetermined signal frequency, a pair of line conductors connecting said remote source to said ringing circuit, a filter tuned to said predetermined frequency connected between said pair of line conductors, a transistor connected to the filter for amplifying the output thereof, means to supply operating power to said transistor, said means comprising a rectifier circuit connected between the line conductors and said transistor wherein said rectifier circuit converts the ringing voltage from said remote source to a D. C. potential, diode means for rectifying the amplified signals connected to the transistor output, a ringer in circuit with the line conductors and a pair of normally-open contacts, and a relay energized by the rectified signals for closing the normally-open contacts and applying the ringing power to said ringer.

12. A selective ringing circuit in accordance with claim 11 wherein said transistor comprises a base electrode, a collector electrode, and an emitter electrode, said base electrode being connected through a resistance to one output lead of said rectifier circuit and said emitter electrode being connected to the other output lead of said rectifier circuit.

13. In a transistor selective signaling system, means to supply D. C. power at a suitable potential to a transistor controlled ringing circuit from a remote source of energy comprising a source of ringing power at a suitable voltage, a pair of line conductors connecting the ringing circuit to said source, said ringing circuit comprising a transistor having base, collector and emitter electrodes, and a rectifying network connected between said pair of line conductors and said transistor for converting the ringing voltage on said conductors to a D. C. potential for powering said transistor.

14. A signaling system in accordance with claim 13 wherein said emitter electrode of the transistor is connected to the more negative output terminal of the rectifying network and said base electrode is connected through a resistance to the more positive output terminal of the rectifying network.

15. A signaling system in accordance with claim 14 wherein said ringing circuit further comprises ringer means, and a switching network operated by said transistor to apply the ringing voltage to said ringer means.

References Cited in the file of this patent

UNITED STATES PATENTS

| | | |
|---|---|---|
| 2,641,653 | Pye | June 9, 1953 |
| 2,666,812 | Kircher | Jan. 19, 1954 |